United States Patent
Beyer et al.

(10) Patent No.: US 10,857,421 B2
(45) Date of Patent: Dec. 8, 2020

(54) TREADMILL WITH DYNAMIC BELT TENSIONING MECHANISM

(71) Applicant: NIKE, Inc., Beaverton, OR (US)

(72) Inventors: Jeffrey A. Beyer, Portland, OR (US); Stacy E. Stamm, Beaverton, OR (US); Jay T. Worobets, Portland, OR (US); Brian R. Brothers, Lake Orion, MI (US); Andrew James Lewis, Royal Oak, MI (US); Edward F. Wettlaufer, Jr., St. Clair Shores, MI (US)

(73) Assignee: NIKE, Inc., Beaverton, OR (US)

( * ) Notice: Subject to any disclaimer, the term of this patent is extended or adjusted under 35 U.S.C. 154(b) by 59 days.

(21) Appl. No.: 15/991,891

(22) Filed: May 29, 2018

(65) Prior Publication Data

US 2018/0345069 A1 Dec. 6, 2018

Related U.S. Application Data

(60) Provisional application No. 62/512,769, filed on May 31, 2017, provisional application No. 62/512,770, filed on May 31, 2017.

(51) Int. Cl.
*A63B 22/02* (2006.01)
*A63B 22/00* (2006.01)
(Continued)

(52) U.S. Cl.
CPC ...... *A63B 22/0228* (2015.10); *A63B 22/0015* (2013.01); *A63B 22/0207* (2015.10);
(Continued)

(58) Field of Classification Search
CPC . A63B 22/0015; A63B 22/0017; A63B 22/02; A63B 22/0207; A63B 22/0214;
(Continued)

(56) References Cited

U.S. PATENT DOCUMENTS 3,142,193 A 7/1964 Polko et al.
3,731,917 A 5/1973 Townsend
(Continued)

FOREIGN PATENT DOCUMENTS

CN 1188191 C 2/2005
EP 1400263 B1 8/2003
(Continued)

OTHER PUBLICATIONS

"Experience—Treadmill." Chinesport Rehabilitation and Medical Equipment. Retrieved Jun. 4, 2018 from the Internet at <https://web.archive.org/web/20170528072025/http://www.chinesport.com/catalogue/treadmills/fitness-treadmills/78856-camminatore-experience/>. Originally Accessed Jun. 17, 2014. 4 pages.
(Continued)

*Primary Examiner* — Gary D Urbiel Goldner
(74) *Attorney, Agent, or Firm* — Shook, Hardy & Bacon L.L.P.

(57) ABSTRACT

A dynamic belt-tensioning apparatus for a treadmill includes a base having a first end and a second end spaced from the first end. A foot-striking platform is movably supported by the base so as to allow vertical movement of the platform during operation of the treadmill. A drive belt has a fixed circumference and is positioned above a top portion of the platform. A drive roller is pivotally mounted adjacent to the first end of the base and engages the drive belt. A tensioning roller is pivotally mounted to the base and is capable of a range of movement to provide substantially constant tension to the drive belt in response vertical movement of the platform.

19 Claims, 8 Drawing Sheets

(51) Int. Cl.
    *B65G 23/44* (2006.01)
    *F16H 7/12* (2006.01)
    *F16H 7/08* (2006.01)

(52) U.S. Cl.
    CPC .......... *A63B 22/0235* (2013.01); *B65G 23/44* (2013.01); *F16H 7/12* (2013.01); *F02B 2275/06* (2013.01); *F16H 2007/0865* (2013.01)

(58) Field of Classification Search
    CPC ............ A63B 22/0228; A63B 22/0235; A63B 22/025; A63B 22/0046; A63B 22/0257; A63B 22/0264; A63B 26/00; A63B 26/003; A63B 69/0028; A63B 69/0035; A63B 2069/0037; A63B 71/0054; A63B 2071/0063; A63B 2071/0072; A63B 2225/09; A63B 2225/093; A63B 2225/096; B65G 23/00; B65G 23/44; F16H 7/00; F16H 7/08; F16H 7/10; F16H 2007/00; F16H 7/0863; F16H 7/12; F16H 2007/0865; F02B 2275/00; F02B 2275/06
    See application file for complete search history.

(56) References Cited

U.S. PATENT DOCUMENTS

| | | | |
|---|---|---|---|
| 3,921,793 | A | 11/1975 | Hutchinson et al. |
| 4,566,689 | A | 1/1986 | Ogden |
| 4,602,779 | A | 7/1986 | Ogden |
| 4,635,928 | A | 1/1987 | Ogden et al. |
| 4,747,810 | A | 5/1988 | Shepley et al. |
| 4,849,666 | A | 7/1989 | Hoag |
| 4,974,831 | A | 12/1990 | Dunham |
| 4,984,810 | A | 1/1991 | Stearns et al. |
| 5,015,926 | A | 5/1991 | Casler |
| 5,302,162 | A | 4/1994 | Pasero |
| 5,336,146 | A | 8/1994 | Piaget et al. |
| 5,382,207 | A | 1/1995 | Skowronski et al. |
| 5,529,553 | A | 6/1996 | Finlayson |
| 5,542,892 | A | 8/1996 | Buhler |
| 5,752,879 | A | 5/1998 | Berdut |
| 5,860,894 | A | 1/1999 | Dalebout et al. |
| 5,993,358 | A * | 11/1999 | Gureghian .............. A63B 22/02 482/54 |
| 6,013,011 | A | 1/2000 | Moore et al. |
| 6,287,240 | B1 | 9/2001 | Trabbic |
| 6,394,239 | B1 | 5/2002 | Carlson |
| 6,409,633 | B1 | 6/2002 | Abelbeck |
| 6,436,008 | B1 * | 8/2002 | Skowronski ....... A63B 22/0023 482/51 |
| 6,607,469 | B2 * | 8/2003 | Ota .................... A63B 22/0235 482/51 |
| 6,652,424 | B2 | 11/2003 | Dalebout |
| 6,776,740 | B1 | 8/2004 | Anderson et al. |
| 6,811,519 | B2 | 11/2004 | Kuo |
| 6,821,230 | B2 | 11/2004 | Dalebout et al. |
| 6,878,100 | B2 | 4/2005 | Frykman et al. |
| 7,156,777 | B2 | 1/2007 | Dyer et al. |
| 7,241,250 | B1 | 7/2007 | French et al. |
| 7,367,926 | B2 | 5/2008 | Clark |
| 7,507,187 | B2 | 3/2009 | Dyer et al. |
| 7,513,852 | B2 | 4/2009 | Wilkins et al. |
| 7,563,203 | B2 | 7/2009 | Dalebout et al. |
| 7,645,212 | B2 | 1/2010 | Ashby et al. |
| 7,874,963 | B2 | 1/2011 | Grind |
| 8,172,729 | B2 | 5/2012 | Ellis |
| 8,597,161 | B2 | 12/2013 | Dibble et al. |
| 8,968,160 | B2 | 3/2015 | Cassano |
| 8,979,709 | B2 | 3/2015 | Toback et al. |
| 9,233,267 | B2 | 1/2016 | Wilkins |
| 9,352,186 | B2 | 5/2016 | Watterson |
| 9,367,668 | B2 | 6/2016 | Flynt et al. |
| 9,370,686 | B2 | 6/2016 | Lee |
| 2001/0034272 | A1 | 10/2001 | Sobol |
| 2004/0259690 | A1 | 12/2004 | Frykman et al. |
| 2005/0009668 | A1 | 1/2005 | Savettiere et al. |
| 2005/0032610 | A1 | 2/2005 | Nelson et al. |
| 2005/0045452 | A1 * | 3/2005 | Iseli .................. B65G 23/44 198/813 |
| 2005/0164839 | A1 | 7/2005 | Watterson et al. |
| 2006/0160669 | A1 | 7/2006 | Lizarralde |
| 2007/0281832 | A1 * | 12/2007 | Alessandri ............ A63B 22/02 482/54 |
| 2008/0242511 | A1 | 10/2008 | Munoz et al. |
| 2008/0312047 | A1 | 12/2008 | Feng |
| 2010/0160115 | A1 | 6/2010 | Morris et al. |
| 2011/0281692 | A1 | 11/2011 | Maresh |
| 2012/0184409 | A1 | 7/2012 | Beal |
| 2013/0267386 | A1 | 10/2013 | Her |
| 2014/0011642 | A1 * | 1/2014 | Astilean ................ A63B 22/02 482/54 |
| 2014/0274577 | A1 | 9/2014 | Beard et al. |
| 2015/0151156 | A1 | 6/2015 | Piaget et al. |
| 2016/0023045 | A1 | 1/2016 | Dalebout |
| 2016/0144225 | A1 | 5/2016 | Dalebout et al. |
| 2016/0289006 | A1 * | 10/2016 | de Lore ................ B65G 21/14 |
| 2016/0367851 | A1 * | 12/2016 | Astilean ................... B62K 7/00 |
| 2018/0345068 | A1 * | 12/2018 | Beyer ................ A63B 22/0235 |

FOREIGN PATENT DOCUMENTS

| | | | |
|---|---|---|---|
| EP | 1606026 | A2 | 9/2004 |
| EP | 1815887 | A1 | 8/2007 |
| EP | 2762204 | A1 | 8/2014 |
| EP | 2673056 | A4 | 9/2015 |
| GB | 2196266 | A | 4/1988 |
| KR | 2001-0083808 | A | 9/2001 |
| WO | 0130464 | A1 | 5/2001 |
| WO | 2001056664 | A1 | 8/2001 |
| WO | 2007016555 | A2 | 2/2007 |
| WO | 2008099429 | A1 | 8/2008 |
| WO | 2013138375 | A1 | 9/2013 |
| WO | 2016065077 | A1 | 4/2016 |

OTHER PUBLICATIONS

"Commercial 1750." NordicTrack. Retrieved Jun. 4, 2018 from the Internet at <https://web.archive.org/web/20160831055040/https://www.nordictrack.com/treadmills/commercial-1750-treadmill>. Originally Accessed Aug. 2016. 8 pages.

"Teadmill Drive Belt Adjustments." Treadmill Doctor. Retrieved on Jun. 4, 2018 from the Internet at <http://web.archive.org/web/20071214194042/http://www.treadmilldoctor.com/treadmill-drive-belt-adjustment>. Originally accessed on Dec. 14, 2007. 1 page.

"FORCE: Test Your Limits." Woodway. Retrieved on Jun. 4, 2018 from the Internet at <http://web.archive.org/web/2015/1024092756/http://www.woodway.com/products/force>. Originally accessed on Oct. 24, 2015. 9 pages.

"The Boston Marathon GSX Treadmill." Gym Source. Retrieved on Jun. 7, 2018 from the Internet at <https://web.archive.org/web/20151229050443/http://www.gymsource.com/boston-marathon-gsx-treadmill>. Originally accessed on Dec. 29, 2015. 4 pages.

"Bowflex Treadclimber TC200." Bowflex. Retrieved on Jun. 7, 2018 from the Internet at <https://web.archive.org/web/20171202032522/http://www.bowflex.com/treadclimber/tc200/100457.html>. Originally accessed on Aug. 2016. 6 pages.

"Stamina InMotion II Treadmill." Stamina Products, Inc. Retrieved on Jun. 7, 2018 from the Internet at <https://web.archive.org/web/20110103001159/http://www2.staminaproducts.com/products/product_details.cfm?PID=45-1002A&cat=Treadmills>. Originally accessed on Jan. 3, 2011. 4 pages.

"Cybex Treadmills." Cybex. Retrieved on Jun. 7, 2018 from the Internet at <http://web.archive.org/web/20120330034557/http://www.cybexintl.com/products/treadmills.aspx>. Originally accessed on Mar. 30, 2012. 2 pages.

"Commercial Treadmills." True. Retrieved on Jun. 7, 2018 from the Internet at <https://web.archive.org/web/20160320211126/http://www.truefitness.com/commercial-fitness/treadmills/>. Originally accessed on Mar. 20, 2016. 1 page.

(56) References Cited

OTHER PUBLICATIONS

International Search Report and Written Opinion dated Aug. 16, 2018 in International Patent Application No. PCT/US2018/035368, 17 pages.
International Search Report and Written Opinion dated Sep. 4, 2018 in International Patent Application No. PCT/US2018/035376, 15 pages.
Non-Final Office Action received for U.S. Appl. No. 15/991,499, dated Apr. 23, 2020, 14 pages.
International Preliminary Report on Patentability dated Dec. 12, 2019 in International Patent Application No. PCT/US2018/035376, 9 pages.
International Preliminary Report on Patentability dated Dec. 12, 2019 in International Patent Application No. PCT/US2018/035368, 11 pages.
Notice of Allowance received for U.S. Appl. No. 15/991,499, dated Sep. 3, 2020, 16 pages.

* cited by examiner

TREADMILL WITH DYNAMIC BELT TENSIONING MECHANISM

CROSS-REFERENCE TO RELATED APPLICATIONS AND CLAIM OF PRIORITY

This Non-Provisional Patent Application claims priority to co-pending U.S. Provisional Patent Application No. 62/512,770, filed May 31, 2017, titled "Treadmill Dynamic Belt Tensioning Mechanism," and also claims priority to co-pending U.S. Provisional Patent Application No. 62/512,769, filed May 31, 2017, titled "Treadmill with Vertically Displaceable Platform." These applications are assigned or under obligation of assignment to the same entity as the present application, and are each herein incorporated by reference in the entirety. This application is also related by subject matter to U.S. patent application Ser. No. 15/991,499, filed concurrently with this application on May 29, 2018, titled "Treadmill with Vertically Displaceable Platform,", which also claims priority to the two above-listed provisional applications, and is also assigned or under obligation of assignment to the same entity as the present application, and is incorporated herein by reference in the entirety.

TECHNICAL FIELD

This disclosure describes a dynamic belt-tensioning mechanism for use with a treadmill.

BACKGROUND

A treadmill has an endless belt powered by a drive roller. The belt is the surface upon which a user engages in an activity. The endless belt results in the user being able to engage in an activity in a relatively defined space.

SUMMARY

This summary is intended to introduce a selection of concepts in a simplified form that are further described below in the detailed description section of this disclosure. This summary is not intended to identify key or essential features of the claimed subject matter, and is also not intended to be used as an aid in isolation to determine the scope of the claimed subject matter.

In brief, and at a high level, this disclosure describes, among other things, dynamic belt-tensioning apparatuses/mechanisms for treadmills as well as methods of using the same. In one aspect, a dynamic belt-tensioning apparatus includes a base having a first end and a second end spaced from the first end, a foot-striking platform capable of vertical movement, a drive belt having a fixed circumference, a drive roller mounted to the base that engages the drive belt, and a tensioning roller that is rotatably mounted on the base and is adapted to move between a range of different positions to enable it to provide continuous tensioning of the drive belt with changes in vertical position of the platform. The apparatus may include movable components that translate force from the platform to the tensioning roller to facilitate the maintaining of substantially constant tension on the drive belt by the tensioning roller.

In one aspect hereof, a dynamic belt-tensioning apparatus for a treadmill is provided. The apparatus includes a base capable of being positioned on a solid surface and having a first end and a second end spaced from the first end, a foot-striking platform movably supported by the base so as to allow vertical movement of the platform during operation of the treadmill, a drive belt having a fixed circumference and positioned above a top portion of the platform so as to provide a moving foot-engagement surface during operation of the treadmill, a drive roller rotatably mounted adjacent to the first end of the base that engages the drive belt, and a tensioning roller rotatably mounted to the base and capable of a range of movement to provide substantially constant tension to the drive belt in response to vertical movement of the platform.

In another aspect hereof, a dynamic belt-tensioning apparatus for a treadmill is provided. The apparatus comprises a base capable of being positioned on a solid surface and having a first end and a second end spaced from the first end and including a first vertically-disposed support frame and a second vertically-disposed support frame mounted on opposite sides of the base adjacent to the second end, a foot-striking platform movably supported by the base so as to allow vertical movement of the platform during operation of the treadmill, a drive belt having a fixed circumference and positioned above a top portion of the platform so as to provide a moving foot-engagement surface during operation of the treadmill, a drive roller rotatably mounted adjacent to the first end of the base that engages the drive belt, and a tensioning roller having a first end rotatably and slidably mounted to the first support frame and a second end rotatably and slidably mounted to the second support frame. The tensioning roller is capable of a range of movement to provide substantially constant tension to the drive belt in response to vertical movement of the platform.

In another aspect hereof, a method of tensioning a belt on a treadmill is provided, the treadmill including a base with a platform mounted thereto so that the platform is capable of vertical movement, is provided. The method comprises driving a belt, engaging a tensioning roller with the belt, and moving the tensioning roller to provide substantially constant tension to the belt in response to vertical movement of the platform.

DESCRIPTION OF THE DRAWINGS

Aspects hereof are described in detail herein with reference to the attached drawing figures, in which like numerals refer to like elements, wherein.

DETAILED DESCRIPTION

The subject matter of this disclosure is described herein to meet statutory requirements. However, this description is not intended to limit the scope hereof. Rather, the claimed subject matter may be embodied in other ways, to include different steps, combinations of steps, features, and/or combinations of features, similar to those described herein, and in conjunction with other present or future technologies. Moreover, although the terms "step" and "block" may be used herein to identify different elements of methods employed, the terms should not be interpreted as implying any particular order among or between various steps or blocks except when the order is explicitly described and required.

Figure 1:
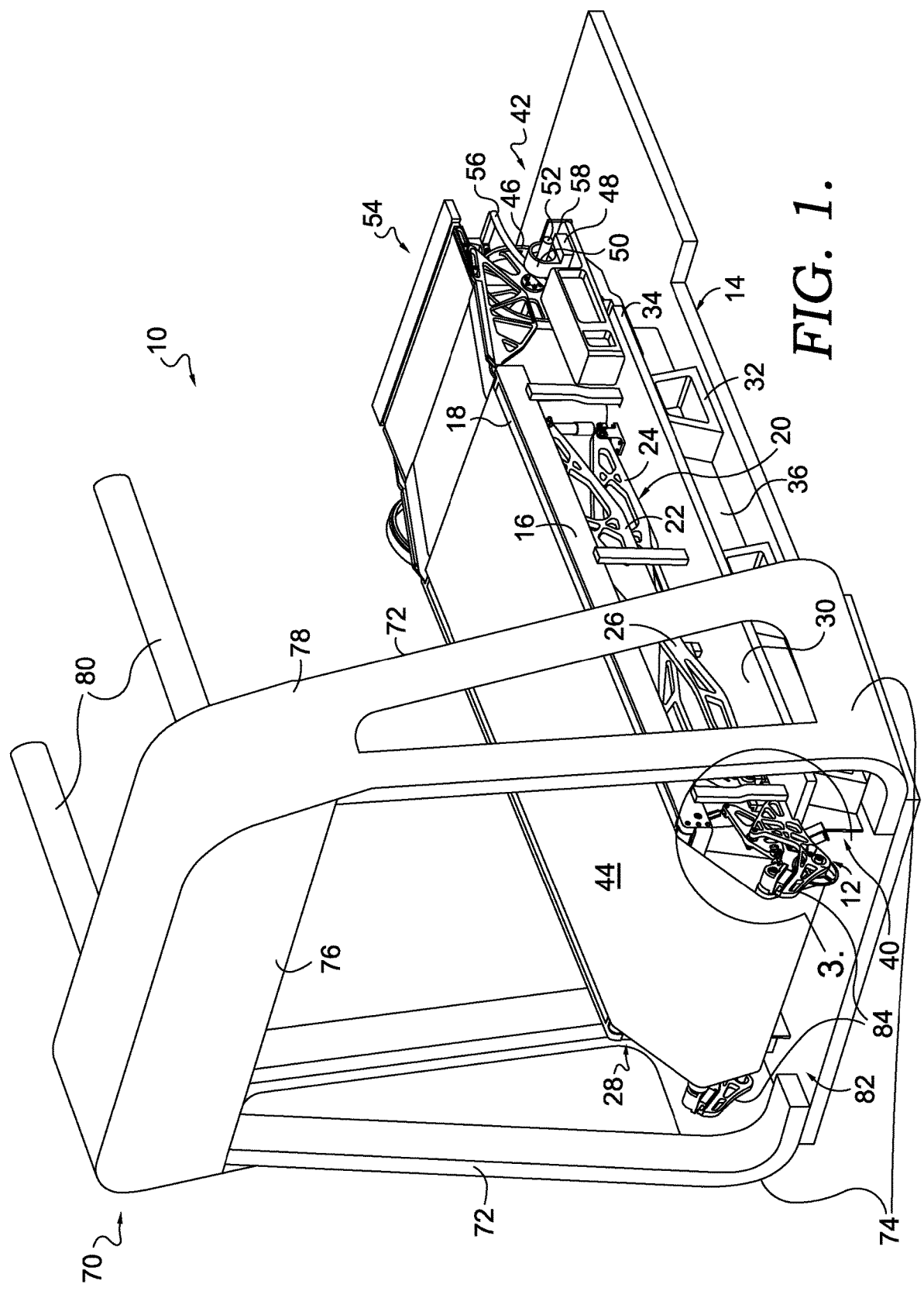
FIG. 1 depicts a top perspective view of a treadmill with a dynamic belt-tensioning mechanism, in accordance with an aspect hereof.

FIGS. 1-7 describe example apparatuses and mechanisms for dynamically tensioning a belt of a treadmill, as well as methods of using the same. Referring initially to FIG. 1, a treadmill 10 with a dynamic belt-tensioning mechanism 12 is depicted, in accordance with an aspect hereof. The treadmill 10 has a base 14 for supporting the treadmill 10 on a suitable support surface. The treadmill 10 includes a platform 16 that is supported above the base 14 and is vertically movable to a number of different vertical positions in response to user interaction on an upper surface 18 of the treadmill 10. More specifically, any suitable structure can be used to support the platform 16 above the base 14 to allow the platform 16 to move relative to the base 14 in an up and down manner (e.g., when a user runs on the platform 16). The up and down movement of the platform 16 therefore accommodates downward force exerted by a user on the upper surface 18 when performing, for instance, a running or walking motion. During a running motion, for example, the platform 16 may be displaced downward (e.g., towards the base 14) as a user's foot strikes the platform 16. Still further, as the user's foot is removed during a running motion, the platform 16 may be moved upward with a rebound force in preparation for the user's other foot striking the upper surface 18. A suitable support structure for supporting the platform 16 for vertical movement above the base 14 is the scissor framework 20 depicted in FIG. 1. The scissor framework 20 includes a first scissor arm 22 pivotally mounted to a second scissor arm 24 at a pivot point 26. The arms 22 and 24 are suitably mounted between the platform 16 and the base 14 to allow the platform 16 to be positioned at various heights above the base 14. The scissor framework 20 is but one example embodiment that allows for vertical movement of the platform 16 with respect to the base 14. Other structures and frameworks such as, for instance, linear bearings and/or tracks can provide the same type of vertical motion to the platform 16.

Figure 2:
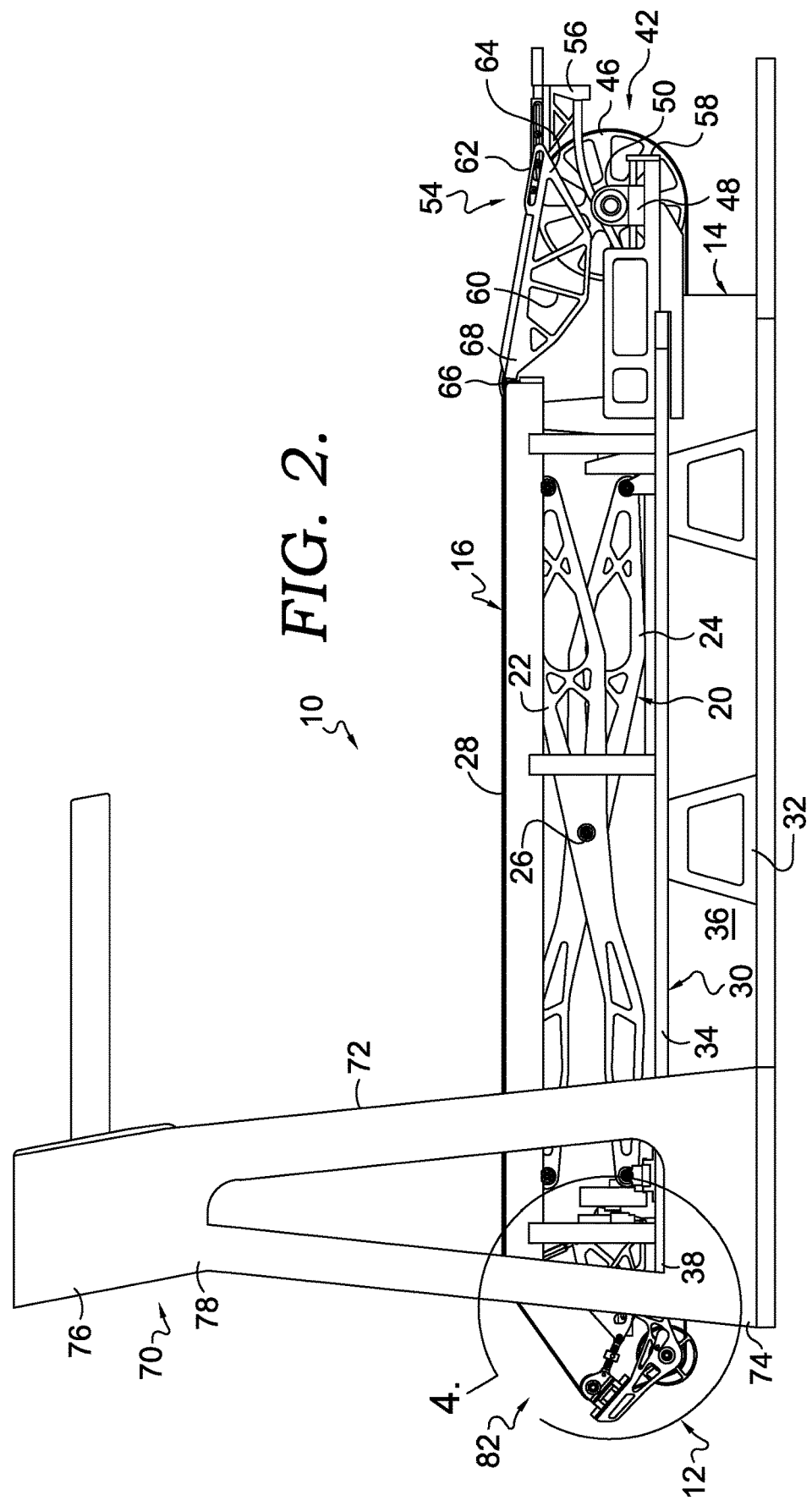
FIG. 2 depicts a side elevation view of the treadmill of FIG. 1, in accordance with an aspect hereof.
Figure 3:
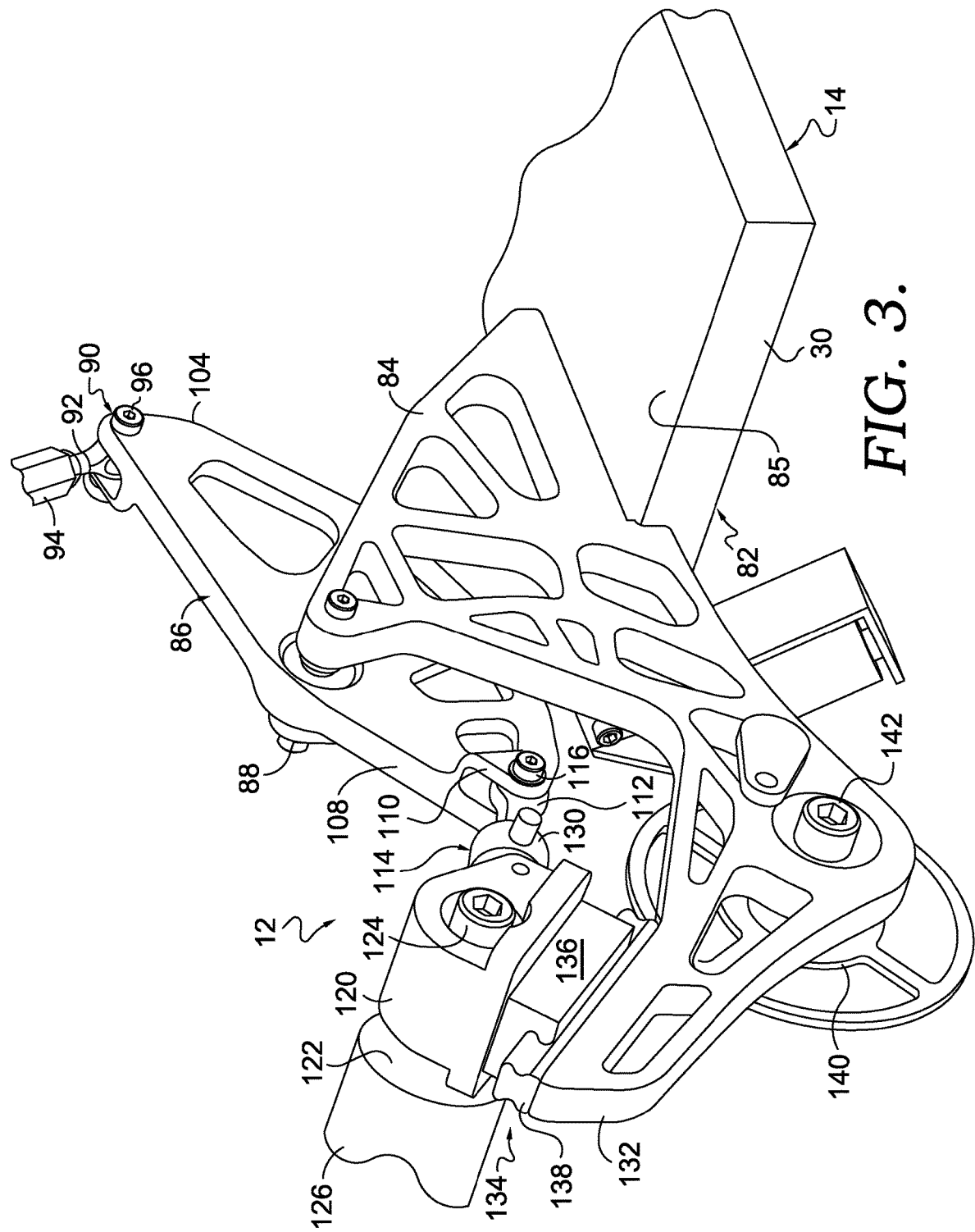
FIG. 3 depicts a top perspective view of the area designated by the numeral 3 in FIG. 1, showing one example of a dynamic belt-tensioning mechanism, in accordance with an aspect hereof.
Figure 4:
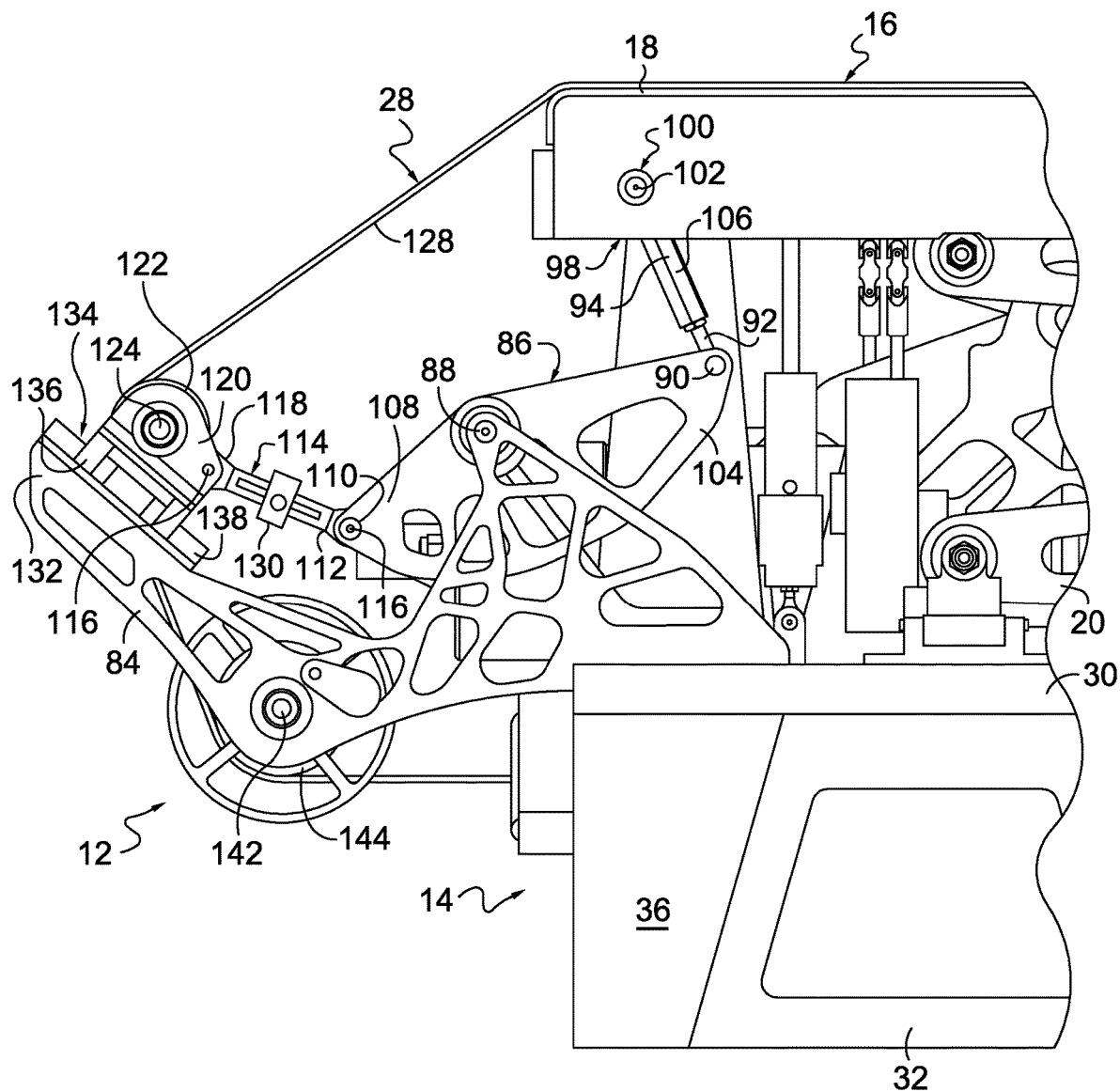
FIG. 4 depicts a side elevation view of the area designated by the numeral 4 in FIG. 2, showing a treadmill platform in an elevated position with respect to a treadmill base, in accordance with an aspect hereof.

Referring now to FIGS. 1-2, the treadmill 10 also includes an endless/drive belt 28 that provides a moving surface for a user to engage with during usage of the treadmill 10. More specifically, the belt 28 has a fixed circumference and moves over the upper surface 18 of the platform 16. Thus, as a user, for instance, walks or runs, the belt 28 is moved beneath the user's feet to allow walking or running at a single location. In addition to moving over the upper surface 18, the belt 28 also moves under a bottom plate 30 of the base 14. More specifically, referring to FIGS. 1-2, the bottom plate 30 is supported above a ground surface by a plurality of generally trapezoidal legs 32 that are also part of the base 14. The legs 32 are positioned along each edge 34 of the plate 30. Only one of the edges 34 is depicted in FIGS. 1-2, the other being obscured. Still further, the legs 32 along each edge 34 are connected by a support rib 36 extending downward from a lower surface 38 of the bottom plate 30. The provision of a support rib 36 along each side of the bottom plate 30 defines a cavity 40 through which the belt 28 passes adjacent the lower surface 38 of the bottom plate 30. In this manner, the belt 28 is able to run in a continuous loop along the upper surface 18 of the platform 16 and along the lower surface 38 of the bottom plate 30 of the base 14.

Referring still to FIGS. 1-2, a belt drive mechanism 42 is depicted. The belt drive mechanism 42 serves to provide the endless motion to the belt 28 so that the user has a continuous running/walking surface as the user moves across the upper surface 44 of the belt 28. The belt drive mechanism 42 may be used to adjust the speed at which the user runs or walks. Any suitable control system may be used to adjust the speed of the belt drive mechanism 42 and thus the speed of the belt 28 shown in FIGS. 1-2.

The belt drive mechanism 42 includes a drive roller 46 rotatably mounted to the base 14 by a pair of mounting brackets 48 positioned on opposite sides of the base 14. Only one of the mounting brackets 48 is depicted in FIGS. 1-2, the other being obscured. The mounting brackets 48 extend upwardly from the plate 30 of the base 14 and each provides a pivot bearing 50 for receiving an axle 52 of the drive roller 46. The provision of the axle 52 rotatably mounted in the pivot bearings 50 allows for the rotating motion of the drive roller 46. The drive roller 46 is coupled to any suitable power source to drive the rotating motion of the drive roller 46 and thus the belt 28. The power source is not depicted in the figures, but may be any suitable source such as, for example, an electric motor or a hydraulic motor drivably coupled to the drive roller 46 by a belt or chain system for example. The power source can also be directly acting on the axle 52 to accomplish the rotating motion.

Referring still to FIGS. 1-2, the treadmill 10 also includes a transition framework 54 for facilitating a smooth transition of the belt 28 between the base 14 and the platform 16, particularly as the platform 16 is displaced between a number of different vertical positions with respect to the base 14 during operation of the treadmill 10. The transition framework 54 includes a support structure 56 fixedly mounted to the base 14 adjacent to the belt drive mechanism 42. The support structure extends along the entire rear edge 58 of the base 14. The transition framework 54 further includes a bridge 60 for supporting the belt 28 as it transitions to the platform upper surface 18 from the drive roller 46. The bridge 60 is slidably and pivotally mounted to the support structure 56 by a pin and slot arrangement 62 adjacent to a rear end 64 of the bridge 60. The bridge 60 is pivotally mounted to the platform 16 by a pivot arrangement 66 adjacent a forward end 68 of the bridge 60. Thus, as the platform 16 moves in relation to the base 14 during operation, the bridge 60 pivots and slides with respect to the base 14 via the pin and slot arrangement 62. Still further, the bridge 60 pivots with respect to the platform 16 via the pivot arrangement 66 during vertical movement of the platform 16. In this manner, the bridge 60 changes it's angle relative to the platform 16 as the platform 16 becomes vertically displaced and thereby provides a smooth transition support surface for the belt 28.

Referring still to FIGS. 1-2, the platform 16 further includes an operator support frame 70 that includes a pair of vertically extending pillars 72 fixedly mounted to opposite sides of the base 14 adjacent the lower ends 74 of the pillars 72. The operator support frame further includes a console 76 mounted between and adjacent to the upper ends 78 of the pillars 72. A pair of bracing arms 80 extend rearwardly from opposite sides of the console 76 to provide lateral support and stability for a user engaging with the platform 16. The console 76 can include various sensors and displays, if desired, to monitor or inform the user.

Referring to FIGS. 3-6, the example dynamic belt-tensioning mechanism 12 shown in FIGS. 1-2 is depicted in detail and is disposed adjacent a forward end 82 of the treadmill 10. The tensioning mechanism 12 provides increased and/or substantially constant tension to the belt 28 as the platform 16 moves up and down in relation to the base 14. More specifically, the belt 28 has a fixed circumference. As the platform 16 moves up and down, the spatial relationship between the platform 16 and the base 14 is dynamically changing. Without the belt-tensioning mechanism 12, slack may exist in the belt 28 as the platform 16 moves downwardly towards the base 14. This slack may result in possible disengagement of the belt 28 from the drive roller 46. Still further, the slack may result in an unstable running surface on the upper surface 44 of the belt 28. The belt-tensioning mechanism 12 therefore provides a substantially constant tension in the belt 28 no matter the relative vertical position of the platform 16 above the base 14 using the tensioning mechanism 12.

The dynamic belt-tensioning mechanism 12 includes a pair of support frames 84 mounted adjacent the forward end 82 of the treadmill 10. The support frames 84 are mounted on the upper surface 85 of the plate 30 of the base 14. As depicted in FIG. 1, the support frames 84 are positioned on opposite sides of the plate 30 and extend upwardly from the upper surface 85. Each of the support frames 84 includes a bell crank 86 pivotally mounted thereto by a pivot pin 88. Each of the bell cranks 86 includes a rear pivot connection 90 connected to a first end 92 of a platform linkage 94 by a pivot/ball joint 96. A second end 98 of the platform linkage 94 is pivotally connected to the platform 16 at a pivot point 100 by a pivot/ball joint 102. The pivot/ball joints 96 and 102 may allow for rotation in all directions to minimize friction and binding. The pivot connection 90 is located at a rearward end 104 of the bell crank 86. The linkage 94 has a length adjusting turnbuckle 106 that can be used to adjust the length of the linkage 94.

A forward end 108 of each bell crank 86 has a forward pivot connection 110 connected to a first end 112 of a respective tension roller linkage 114 by a pivot pin 116. A second end 118 of each tension roller linkage 114 is pivotally connected to a respective tension roller mount 120 by the pivot pin 116. The tension roller mounts 120 are positioned on opposite sides of the base 14 and serve to rotatably mount a tension roller 122 by a bearing assembly 124 associated with each of the mounts 120. The provision of the mounts 120 and the bearing assemblies 124 allow the tension roller 122 to freely rotate. The tension roller 122 has a cylindrical surface 126 that engages with an under surface 128 of the belt 28. It is this engagement between the surface 126 and the belt surface 128 that provides the tensioning force on the belt 28 as the platform 16 moves up and down in relation to the base 14. Each tension roller linkage 114 has a load cell transducer 130 that may be used for measuring dynamic belt tension.

Each tension roller mount 120 is slidably connected to a forward end 132 of a respective support frame 84 by a slide connection 134. Each slide connection 134 includes a female slide groove member 136 that is part of or mounted to the tension roller mount 120 and a male slide protrusion member 138 that is a part of or mounted to the forward end 132 of the support frame 84. With this construction, the mounts 120 and thus the tension roller 122 may have a sliding, linear motion capability with respect to the forward ends 132 of the support frames 84. It is this sliding motion that facilitates the dynamic tensioning of the belt 28.

In addition to the tension roller 122, an idler roller 140 is also rotatably mounted between the support frames 84 by bearing arrangements 142. The idler roller 140 also has a cylindrical surface 144 that engages the belt 28 under belt surface 128. The idler roller 140 remains positionally fixed, but freely rotatable during operation of the tensioning mechanism 12. The idler roller 140 serves to support the belt 28 during operation and assist the dynamic tensioning supplied by the linearly moving tension roller 122.

Figure 5:
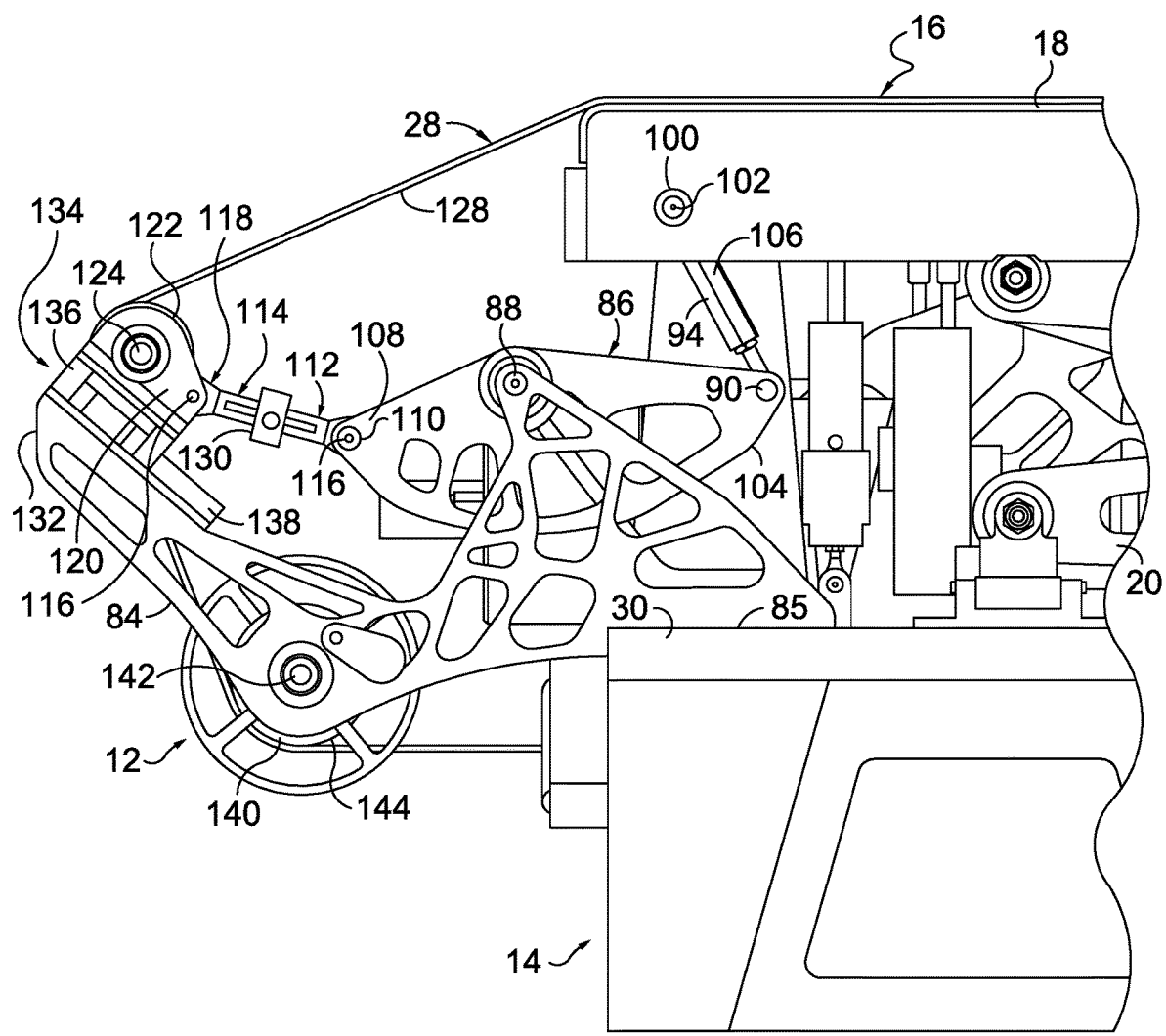
FIG. 5 depicts a side elevation view similar to FIG. 4, but instead shows the treadmill platform in a lowered position with respect to the treadmill base, in accordance with an aspect hereof.
Figure 6:
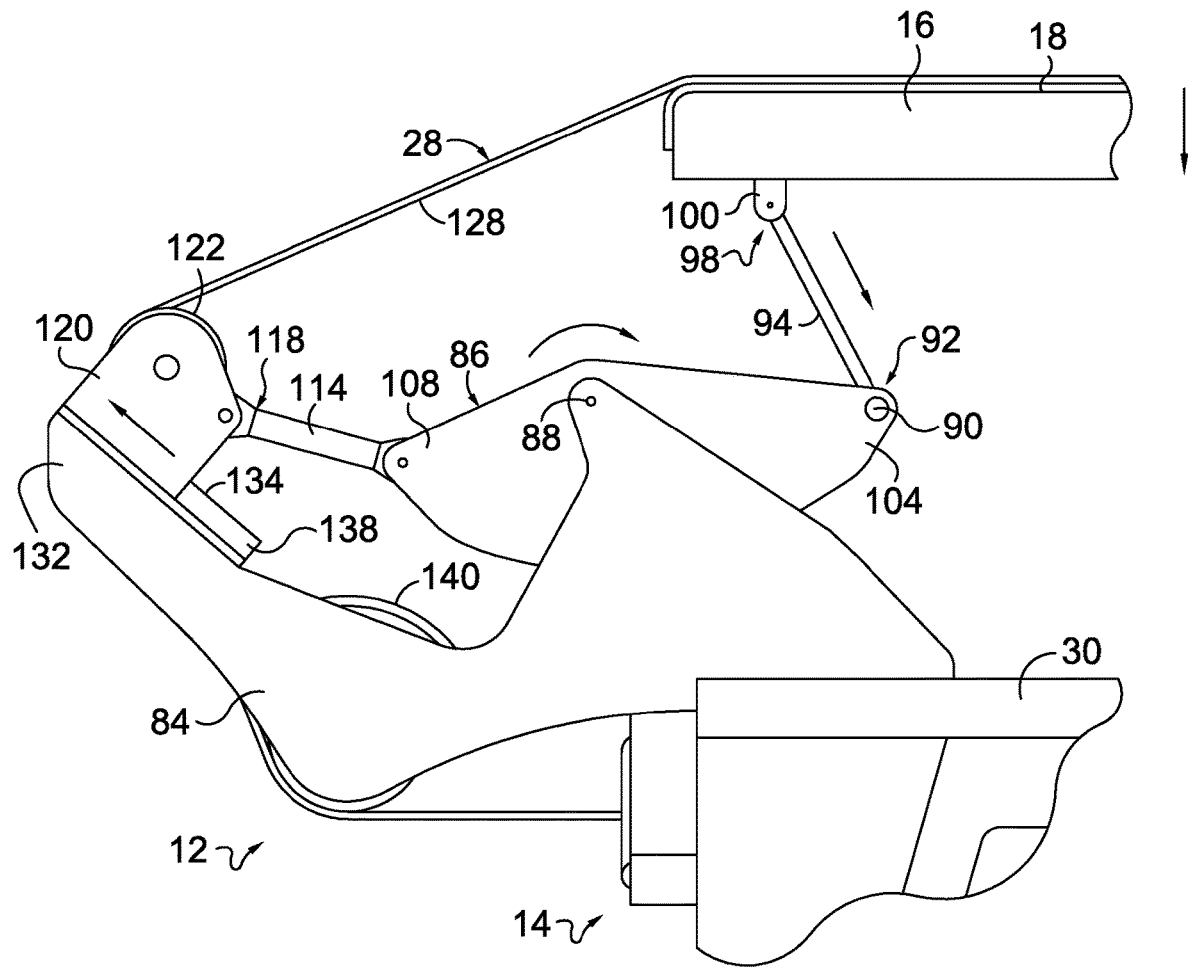
FIG. 6 depicts a side diagrammatic elevation view of the dynamic belt-tensioning mechanism shown in FIG. 1 with arrows indicating the direction of displacement and rotation of the various parts, in accordance with an aspect hereof.

Referring to FIG. 6, during operation of the treadmill 10, the spatial position of the platform 16 changes dynamically in a generally vertical direction with respect to the base 14 (e.g., moving towards and away from the base 14). As the platform 16 moves downwardly, a downward force is exerted on the rearward end 104 of the bell crank 86. This downward force results in rotation of the bell crank 86 in a clockwise manner through the linkage 94. The clockwise rotation of the bell crank 86 results in the generally forward and upward linear movement of mounts 120 and thus the tension roller 122 through the provision of the tension linkages 114 and the slide connectors 134. The clockwise rotation of the bell crank 86 results in a generally forward and upward force being applied to the tension roller 122 via the linkages 114. The female slide groove member 136 (shown in FIG. 5) slides along the male protrusion 138 to allow the linear movement of the tension roller 122 to occur. The downward movement of the platform 16 results in less space between the platform 16 and the base 14 such that slack in the fixed circumference belt 28 will increase unless addressed by the dynamic tensioning mechanism 12. The generally forward and upward linear movement of the tension roller 122 reduces the slack and assists in keeping a substantially constant tension on the belt 28.

Still further, as the platform 16 moves upwardly, the bell crank 86 is rotated in a counterclockwise manner through the linkage 94. This counterclockwise rotation of the bell crank 86 results in generally reward and downward linear motion of the tension roller 122 through the provision of the linkages 114, the mounts 120, and the slide connections 134. Referring back to FIG. 4, this upward motion of the platform 16 is depicted. The upward motion of the platform 16 results in a greater spatial relationship between the platform 16 and the base 14. Therefore, the slack in the fixed circumference belt 28 may be reduced and therefore may not be as significant. The linear movement of the tension roller 122 adjusts the tension dynamically in response to the movement of the platform 16. As the platform 16 moves up and down relative to the base 14, the tension roller 122 is also dynamically sliding along the slide connections 134 to provide substantially constant, or rather, sustained, tension on the belt 28.

Figure 7:
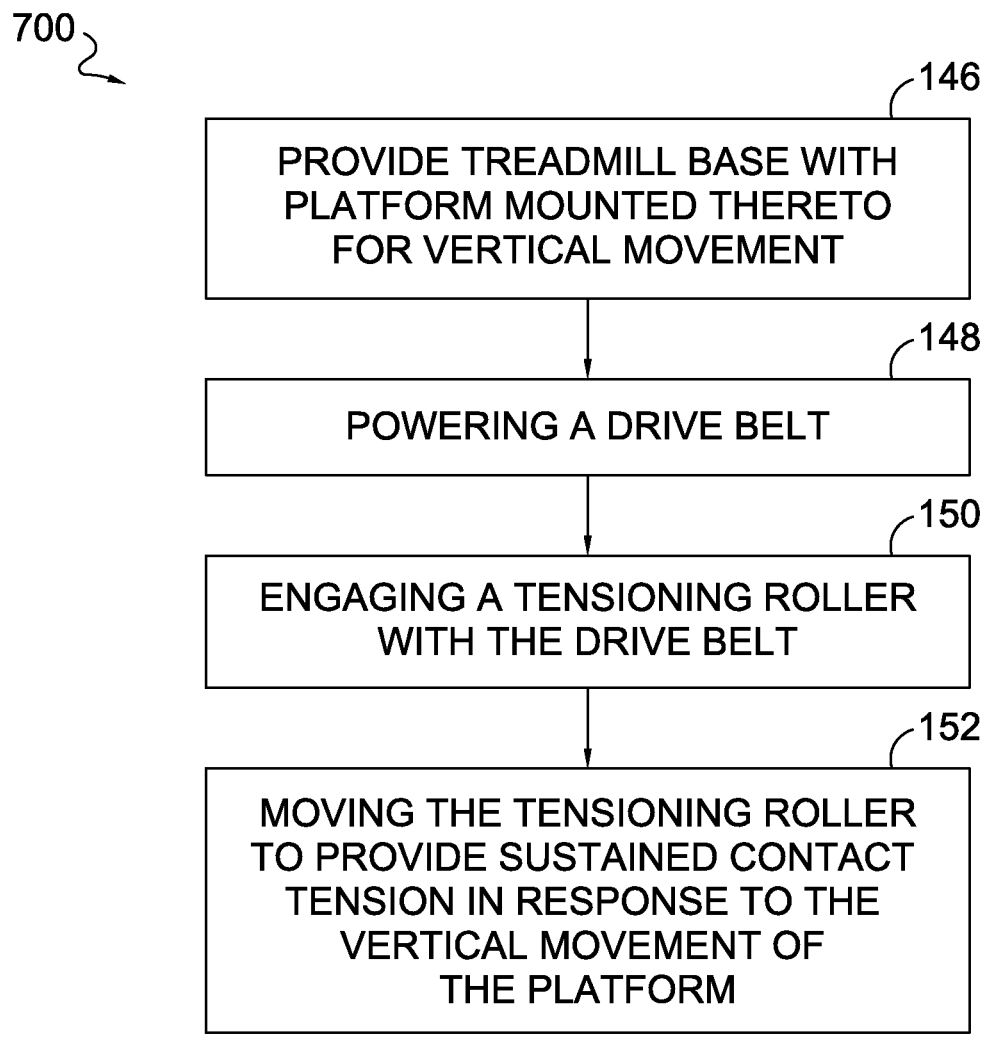
FIG. 7 depicts a block diagram of an example process for dynamically tensioning a treadmill belt, in accordance with an aspect hereof.

Referring to FIG. 7, a block diagram of an example method 700 for dynamically tensioning a treadmill belt is provided, in accordance with an aspect hereof. At block 146, a treadmill with a base, such as the base 14 shown in FIG. 1, with a platform, such as the platform 16 shown in FIG. 1, mounted thereto to provide vertical movement is provided. At block 148, a drive belt, such as the drive belt 28 shown in FIG. 1, is powered. At block 150, a tensioning roller, such as the tensioning roller 122, is engaged with the drive belt. At block 152, the tensioning roller is moved to provide sustained contact tension with the drive belt in response to the vertical movement of the platform.

Figure 8:
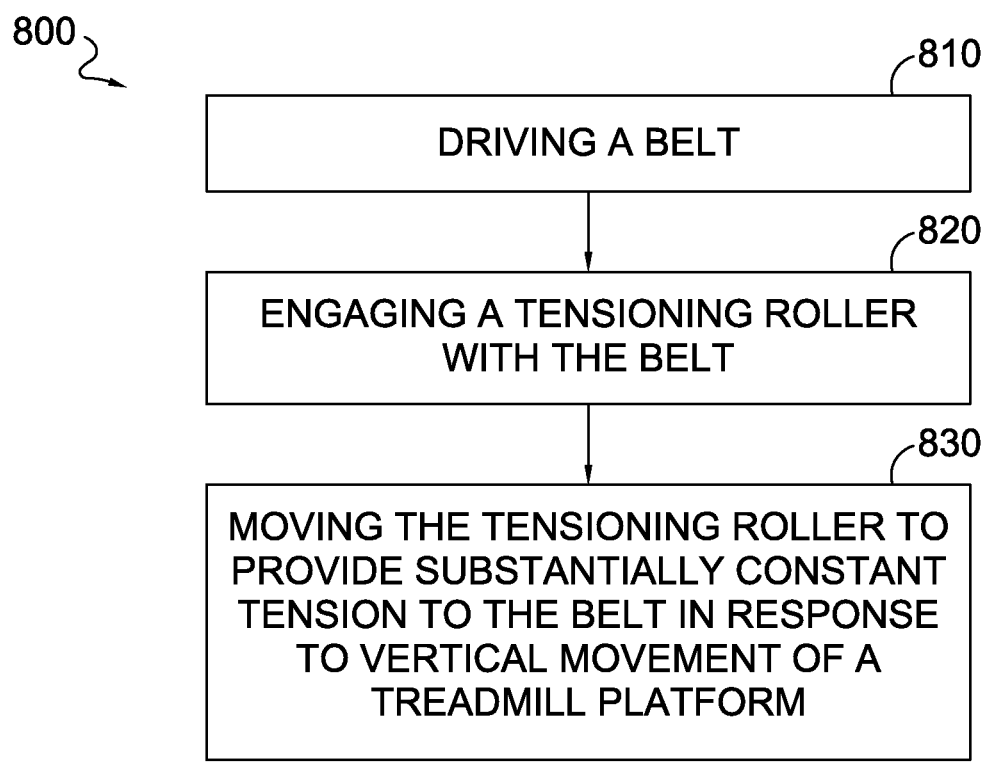
FIG. 8 depicts a block diagram of another example process for dynamically tensioning a treadmill belt, in accordance with an aspect hereof.

Referring to FIG. 8, a block diagram of another example process 800 for dynamically tensioning a treadmill belt is provided, in accordance with an aspect hereof. At block 810, a belt, such as the belt 28 shown in FIG. 1, is driven. At block 820, a tensioning roller, such as the tensioning roller 122 shown in FIG. 6, is engaged with the belt. At block 830, the tensioning roller is moved, such as by using an assembly of components as shown in FIGS. 5 and 6, to provide substantially constant tension to the belt in response to vertical movement of a treadmill platform, such as the platform 16 shown in FIG. 1.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

What is claimed is:

1. A dynamic belt-tensioning apparatus for a treadmill, the apparatus comprising:
    a base capable of being positioned on a solid surface and having a first end and a second end spaced from the first end;
    a foot-striking platform being linear and movably supported by the base so as to allow for vertical movement of the foot-striking platform during operation of the treadmill;
    a drive belt having a fixed circumference, the drive belt extending across a top portion of the foot-striking platform so as to provide a moving foot engagement surface during operation of the treadmill;
    a drive roller rotatably mounted adjacent to the first end of the base that engages the drive belt; and
    a tensioning roller rotatably mounted to the base and capable of a range of movement thereby allowing it to dynamically provide substantially constant tension to the drive belt during the vertical movement of the foot-striking platform.

2. The apparatus of claim 1, further comprising a bell crank pivotally mounted adjacent to the second end of the base, wherein the bell crank has a pivot point mounted to the base, a first connection point connected to the tensioning roller, and a second connection point connected to the foot-striking platform, and wherein the vertical movement of the foot-striking platform results in movement of the tensioning roller to provide the substantially constant tension to the drive belt during operation of the treadmill.

3. The apparatus of claim 2, wherein the first connection point of the bell crank is pivotably attached to the tensioning roller.

4. The apparatus of claim 3, wherein the first connection point is attached to the tensioning roller by a linkage.

5. The apparatus of claim 2, wherein the second connection point of the bell crank is pivotably attached to the foot-striking platform.

6. The apparatus of claim 5, wherein the second connection point is attached to the foot-striking platform by a linkage.

7. The apparatus of claim 2, wherein the tensioning roller is slidably mounted to the base to provide linear movement of the tensioning roller to deliver the substantially constant tension to the drive belt.

8. The apparatus of claim 7, wherein the base includes a vertically-disposed support frame, and wherein the vertically-disposed support frame pivotally mounts the bell crank via the pivot point and slidably mounts the tensioning roller.

9. The apparatus of claim 2, wherein the bell crank converts a generally vertical force exerted on the foot-striking platform to a generally horizontal force exerted on the tensioning roller.

10. The apparatus of claim 1, further comprising an idler roller that engages the drive belt and is rotatably mounted adjacent to the second end of the base.

11. The apparatus of claim 1, wherein the base includes two vertically-disposed support frames mounted on opposite sides of the base and two bell cranks that are pivotally mounted respectively to the two vertically-disposed support frames.

12. The apparatus of claim 11, wherein a first end of the tensioning roller is rotatably mounted to a first of the two vertically-disposed support frames and a second end of the tensioning roller is rotatably mounted to a second of the two vertically-disposed support frames.

13. The apparatus of claim 12, wherein the first end of the tensioning roller is connected to a first connection point of a first one of the two bell cranks and the second end of the tensioning roller is connected to a first connection point of a second one of the two bell cranks.

14. The apparatus of claim 13, further comprising an idler roller, wherein a first end of the idler roller is rotatably mounted to the first of the two vertically-disposed support frames and a second end of the idler roller is rotatably mounted to the second of the two vertically-disposed support frames.

15. A dynamic belt-tensioning apparatus for a treadmill, the apparatus comprising:
    a base capable of being positioned on a solid surface and having a first end and a second end spaced from the first end and including a first vertically-disposed support frame and a second vertically-disposed support frame mounted on opposite sides of the base;
    a foot-striking platform movably supported by the base so as to allow for vertical movement of the foot-striking platform during operation of the treadmill;
    a drive belt having a fixed circumference, the drive belt extending across a top portion of the foot-striking platform so as to provide a moving foot engagement surface during operation of the treadmill;
    a drive roller rotatably mounted to the base that engages the drive belt; and
    a tensioning roller having a first end rotatably and slidably mounted to the first vertically-disposed support frame and a second end rotatably and slidably mounted to the second vertically-disposed support frame, wherein the tensioning roller is capable of a range of movement thereby allowing it to dynamically provide substantially constant tension to the drive belt during the vertical movement of the foot-striking platform.

16. The apparatus of claim 15, further comprising a first bell crank pivotally mounted to the first vertically-disposed support frame and a second bell crank pivotally mounted to the second vertically-disposed support frame, wherein each bell crank has a pivot point mounted to its respective vertically-disposed support frame, a first connection point connected to the tensioning roller, and a second connection point connected to the foot-striking platform, wherein the vertical movement of the foot-striking platform results in movement of the tensioning roller to provide the substantially constant tension to the drive belt during operation of the treadmill.

17. The apparatus of claim 16, wherein the first connection point of each bell crank is pivotally attached to the tensioning roller, and wherein the second connection point of each bell crank is pivotally attached to the foot-striking platform.

18. The apparatus of claim 17, wherein the first connection point of each bell crank is attached to the tensioning roller by a linkage, and wherein the second connection point of each bell crank is attached to the foot-striking platform by a linkage.

19. The apparatus of claim 15, further comprising an idler roller, wherein a first end of the idler roller is rotatably mounted to the first vertically-disposed support frame and a second end of the idler roller is rotatably mounted to the second vertically-disposed support frame.

* * * * *